Aug. 27, 1940. R. L. LÉVY 2,212,989
VEHICLE TRUCK
Filed Sept. 8, 1936 3 Sheets-Sheet 1
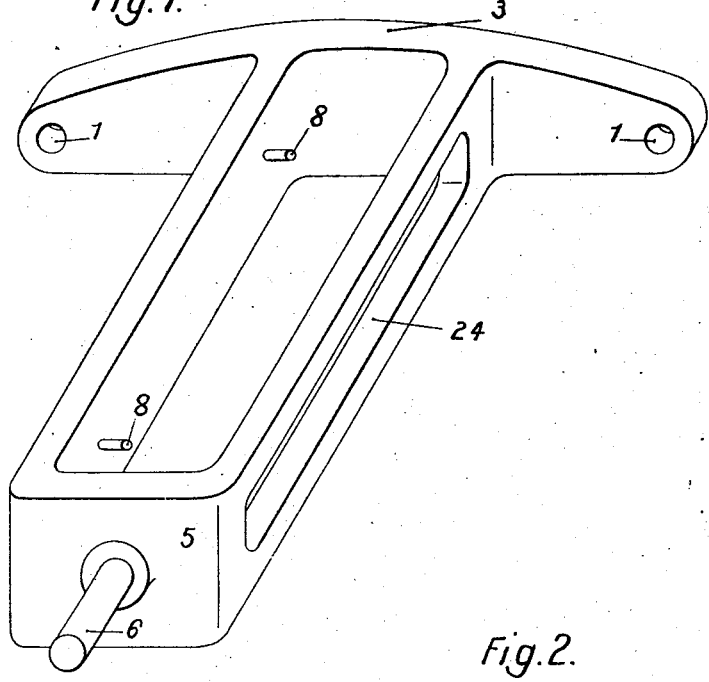
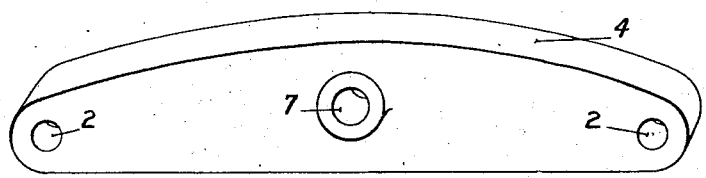
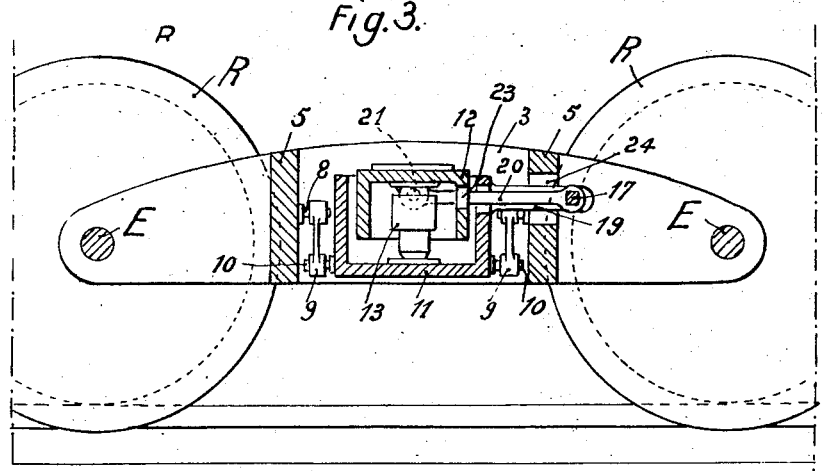
R. L. Lévy
Inventor
By: Glascock Downing & Seebold
Attys.

Aug. 27, 1940.                R. L. LÉVY                2,212,989
VEHICLE TRUCK
Filed Sept. 8, 1936           3 Sheets-Sheet 2
Fig. 4.                       Fig. 5.
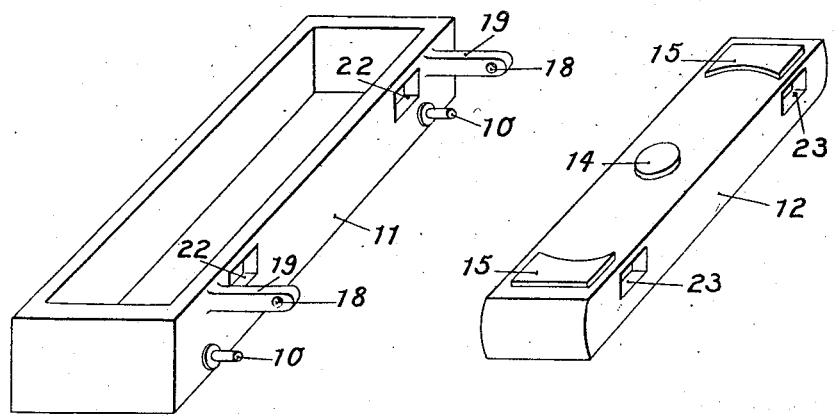
Fig. 6.
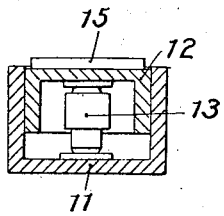
Fig. 7.
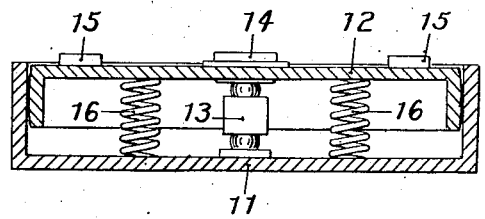

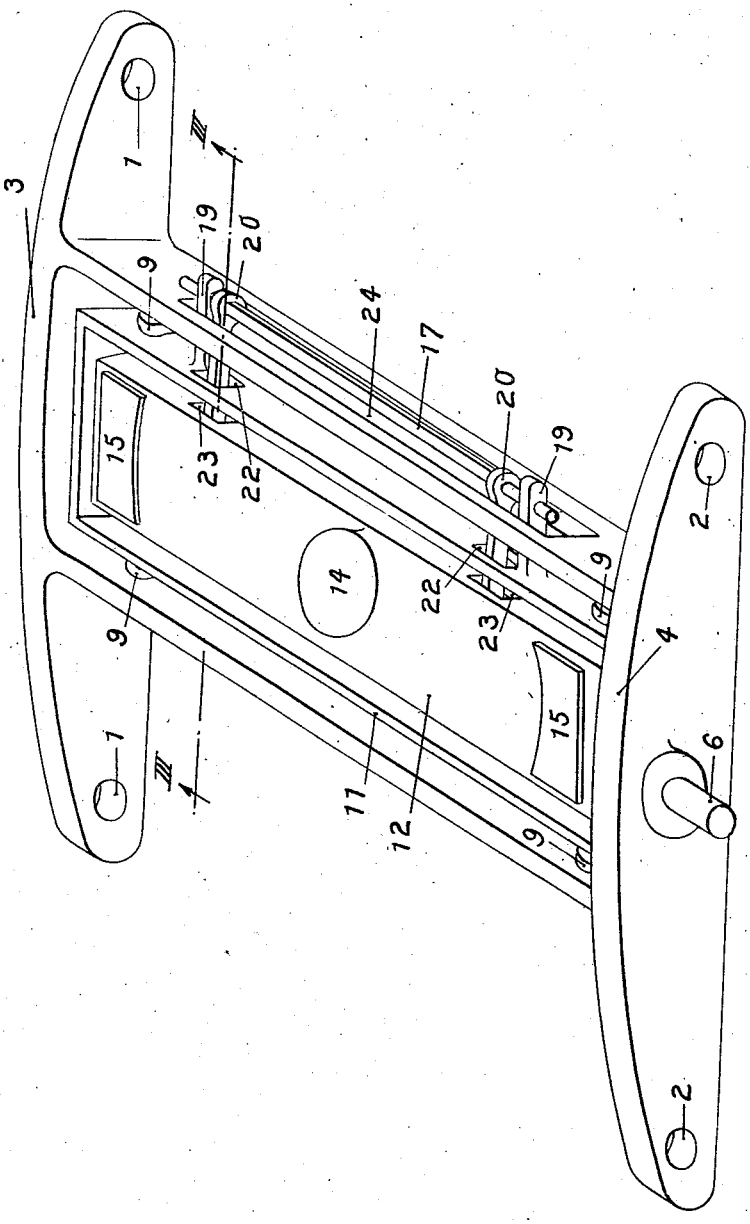

Patented Aug. 27, 1940

2,212,989

UNITED STATES PATENT OFFICE 2,212,989

VEHICLE TRUCK

René Lucien Lévy, Montrouge, France, assignor to Societe d'Inventions Aeronautiques et Mecaniques S. I. A. M., Fribourg, Switzerland Application September 8, 1936, Serial No. 99,899
In France November 18, 1935

3 Claims. (Cl. 105—190)

The present invention relates to trucks for vehicles such as wagons, motor vehicles and the like provided with eight or more wheels.

According to the present invention the chief characteristic of the truck consists in that its vertical suspension is assured by a single member, or device for example a leaf, or coiled spring, a pneumatic or oleopneumatic device, a plastic block or the like.

The single-suspension device may be associated with guiding and suspension devices opposing forces tending to tilt the body in relation to the bogie.

The invention is illustrated by way of example, in the accompanying drawings, in which:

Figures 1 and 2 are perspective views of two component members of a bogie frame;

Figure 3 is a partial view, in vertical section along a plane III—III of Fig. 8;

Figures 4 and 5 are two perspective views, of a transverse suspension member, and of a support forming a guide for the body of the vehicle respectively;

Figure 6 shows a detail, in section in the direction of the track and represents the assembling of the aforesaid two members;

Figure 7 is a sectional view taken crosswise of the track showing a modified arrangement for preventing swinging of the body of the truck frame;

Figure 8 is a complete perspective view.

Referring to Figs. 1, 3 and 8, wheels R are shown integral with axles E, which, in the case of wagons, turn in bearings 1 and 2 in two lateral frame members 3 and 4 which connect them together and support the weight of the body (not shown). It is understood that the bearings may support the axles through the agency of elastic or plastic bushes, or other equivalent means.

The two lateral frame members 3 and 4 are connected together by a transverse member 5. To simplify the construction, said transverse member 5 is preferably integral with one of the lateral members, in which event it will be articulated only on the other lateral member 4 for example by means of a trunnion 6 engaging in a bore 7. Alternatively, means for articulation between the transverse member 5 and the lateral members 3 and 4 could be dispensed with, the lateral member 4 being rigidly attached to the transverse member 5. In such case the deformation stresses set up, through irregularities in the rails, while running, are absorbed by the elasticity of the metal.

The chief characteristic of the invention resides in the fact that the vertical suspension of the body is assured by a single device or member 13, (Figures 3, 6 and 7) disposed between the body of the vehicle and the truck frame, midway of the H-section frame.

In addition to the vertical suspension obtained by means of this monosuspension device, the body may be guided in relation to the other efforts it is called upon to sustain.

With this object in view, the invention embodies the combination, with the above described vertical mono-suspension, of a mounting arrangement similar to that of a yielding sleeper.

The H-section frame is provided with three or four stub shafts 8, on which turn short connecting rods 9, the lower ends of which are provided with bearings for pins 10, arranged parallel with the shafts 8. The pins 10 are integral with a cross plank frame 11 which may also be arranged to oscillate slightly in the transverse direction in relation to the track.

A bolster 12 supporting the body, and being itself supported, elastically, by the vertical suspension device 13 interposed between the cross frame 11 and the bolster 12 supporting the body, is adapted to slide vertically—whilst always remaining guided—in the cross frame 11 forming a cradle. The bolster 12 is provided with a swivel joint 14, for assembling it with the body, and with pivot guides 15 opposing any overturning movement of the body.

The suspension member or device 13 may be of various types, a simple spring or, preferably an oleopneumatic shock absorber, without departing from the scope of the invention.

In some cases, the system constituted in this manner might be too rigid. Another object of the invention consists in associating, with this system of vertical mono-suspension, a device for counteracting rolling or swaying motion of the body. In the example shown in Figure 7, this anti-rolling device consists of two springs 16 on either side of the vertical suspension device 13. Said springs allow the body to oscillate, slightly, crosswise of the track, without lateral displacement.

The springs 16 may be replaced, with advantage by an anti-rolling device acting by torsion, as shown in Figs. 3 and 8.

On a shaft 17 adapted to turn in bearings 18 in lugs 19 on the cross frame 11 are keyed two arms 20 the ends of which are pivotally connected to the bolster 12 supporting the body. Consequently, any effort tending to tilt the body towards either rail in relation to the bogie is opposed by the elastic torsional resistance of the shaft 17.

Apertures 22 in the cross frame 11, openings 23 in the bolster 12, and finally a slot 24 in one branch of the transverse member 5 of the bogie frame, allow freedom of movement of this system ensuring the transverse equilibrium of the body.

If the shaft 17 be unable to bear sufficient torsional deformation, the same result may be obtained by constructing it in two portions, connected together by an elastic torsion member, or by interposing elastic means between the arms 20 and support 12, or by employing arms 20 sufficiently elastic to operate by flexion.

Such a mono-suspension bogie, with anti-rolling device, may also be provided with any kind of horizontal or vertical shock absorbers, capable of further improving the suspension and preventing zig-zag movement.

What I claim as my invention and desire to secure by Letters Patent is:

1. In a vehicle truck, a transverse frame member having means arranged at each end thereof for supporting the transverse member on wheels of the vehicle, a laterally movable plank frame suspended on the transverse frame member, a truck bolster, a single yieldable device supporting the bolster above the plank frame and adapted to receive all vertical displacements between the bolster and the plank frame, bearings carried by the plank frame, a shaft extending along the transverse frame member journalled in said bearings, and arms pivoted to said bolster at spaced points therealong and non-rotatably secured to said shaft whereby the torsional resistance of said shaft will oppose tilting of the bolster with respect to the plank frame.

2. In a vehicle truck, a transverse frame member having means arranged at each end thereof for supporting the transverse member on wheels of the vehicle, a laterally movable plank frame suspended on the transverse frame member, a truck bolster arranged within the plank frame so as to be guided thereby, a single yieldable device supporting the bolster above the plank frame and adapted to receive all vertical displacements between the bolster and the plank frame, lugs projecting laterally from the plank frame and having bearings therein, a shaft extending along the transverse frame member journalled in said bearings, and arms pivoted to said bolster at spaced intervals therealong and keyed to the shaft whereby the torsional resistance of said shaft will oppose tilting of the bolster with respect to the plank frame.

3. A rail car truck having a spring plank member and a swinging bolster member resiliently supported therefrom, a transversely extending torque member mounted on one of the members, and levers connected to the ends of the torque member and to the other truck-member whereby a dipping tendency of one end of the bolster member sets up a reaction on the other end of the bolster member so that it moves in a substantially parallel position with respect to the spring plank.

RENÉ LUCIEN LÉVY.